(12) United States Patent
Raber et al.

(10) Patent No.: US 11,828,686 B1
(45) Date of Patent: Nov. 28, 2023

(54) HANDS-FREE LIQUID SAMPLING METHOD AND APPARATUS

(71) Applicant: Duke Energy Corporation, Charlotte, NC (US)

(72) Inventors: Maverick James Raber, Stanley, NC (US); Jason Chadwick Green, Raleigh, NC (US); Isaac John Medford, Canton, NC (US)

(73) Assignee: Duke Energy Corporation, Charlotte, NC (US)

( * ) Notice: Subject to any disclaimer, the term of this patent is extended or adjusted under 35 U.S.C. 154(b) by 0 days.

(21) Appl. No.: 17/715,670

(22) Filed: Apr. 7, 2022

(51) Int. Cl.
*G01N 1/10* (2006.01)

(52) U.S. Cl.
CPC ..................... *G01N 1/10* (2013.01)

(58) Field of Classification Search
CPC ........................................... G01N 1/10
See application file for complete search history.

(56) References Cited

U.S. PATENT DOCUMENTS

2002/0095997 A1* 7/2002 Cordry ................ G01N 1/12
73/863.71

FOREIGN PATENT DOCUMENTS

| CN | 109357913 A | * | 2/2019 | ............... G01N 1/10 |
| CN | 208607036 U | | 3/2019 | |
| CN | 109159855 B | * | 9/2020 | ............. B63B 21/20 |
| CN | 112525601 A | | 3/2021 | |
| CN | 113447317 A | * | 9/2021 | ............... G01N 1/14 |
| CN | 114013572 A | * | 2/2022 | ............. B63B 22/00 |

* cited by examiner

*Primary Examiner* — Herbert K Roberts
*Assistant Examiner* — Anthony W Megna Fuentes
(74) *Attorney, Agent, or Firm* — Myers Bigel, P.A.

(57) ABSTRACT

Liquid sampling apparatus and methods enable hands free collection of samples from surface waters via drone or other remote delivery systems. The liquid sampling apparatus includes a frame configured to support a plurality of groundwater sampling bailers in circumferential spaced apart relationship around a central axis of the frame, each bailer comprising an elongate tubular housing configured to collect and store a liquid sample from a body of liquid. A weight is movably secured to the frame and is configured to move between a retracted position and a downwardly extended position. When in the downwardly extended position, the weight is configured to maintain the liquid sampling apparatus and the plurality of groundwater sampling bailers in a generally vertical orientation during liquid sample collection.

15 Claims, 6 Drawing Sheets

HANDS-FREE LIQUID SAMPLING METHOD AND APPARATUS

FIELD OF THE INVENTION

The present invention relates generally to sampling methods and apparatus and, more particularly, to liquid sampling methods and apparatus.

BACKGROUND OF THE INVENTION

Conventional methods of sampling bodies of water involve dipping a container into the water by hand or pumping water into a container using tubing at the sampling location. Desired sampling locations may be inaccessible by bank, bridge, wading, or boat or may present a significant safety risk when accessed by these means. To safely collect samples from desired sampling locations with such limitations, alternative means of sample collection must be considered while taking into account sample method and sample volume requirements.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Embodiments of the present inventive concept enable hands free collection of surface water via drone or other remote delivery system, allowing for sample collection in restricted or dangerous areas that present safety and access concerns for personnel. Liquid sampling apparatus according to embodiments of the present inventive concept can be deployed from remote sampling platforms such as drones, extended arm samplers, or cables, and is designed for surface water sampling in lentic and lotic systems (e.g., streams, rivers, lakes, ponds, and other surface water impoundments).

According to some embodiments of the inventive concept, a liquid sampling apparatus includes a frame configured to support at least one groundwater sampling bailer and a weight movably secured to the frame and configured to move between a retracted position and a downwardly extended position. The at least one bailer has an elongate tubular housing configured to collect and store a liquid sample from a body of liquid, such as water (e.g., a river, a lake, a pond, etc.). The bottom end of the at least one bailer has an inlet nozzle through which a liquid sample is collected. When the liquid sampling apparatus is lowered onto the surface of a body of liquid, the weight is in the downwardly extended position and becomes submerged beneath the surface of the body of liquid. The submerged weight maintains the liquid sampling apparatus and the at least one bailer in a generally vertical orientation during liquid sample collection. In addition, the weight serves as ballast to pull the frame into the body of the liquid sufficiently enough so that the at least one bailer inlet nozzle is sufficiently beneath the surface and can collect a sample. Once the at least one bailer collects a sample, the liquid sampling apparatus is lifted from the liquid surface, for example, by hand, via a drone, etc.

In some embodiments, the frame includes a base having at least one holder configured to support a bottom end of the at least one bailer, an upper portion configured to releasably secure the at least one bailer to the frame, and at least one elongate member coupling the base and the upper portion in spaced-apart relation to each other. In some embodiments, the at least one holder includes an opening through which the inlet nozzle of the at least one bailer extends when supported in the at least one holder.

In some embodiments, the upper portion of the frame is configured to slidably receive the at least one bailer.

In some embodiments, the base includes a plurality of legs configured to support the liquid sampling apparatus on a solid surface. The weight is configured to move to the retracted position when the liquid sampling apparatus is supported on a solid surface. The weight is configured to move to the extended position when the liquid sampling apparatus is lifted from the solid surface. In some embodiments, the frame further comprises an elongate first member that extends between the base and the upper portion along an axial centerline of the frame, and the weight is supported by an elongate second member that is telescopically associated with the first member.

In some embodiments, the frame comprises a lifting handle that allows the apparatus to be manually lifted and/or lifted by a drone or other apparatus.

According to some embodiments of the inventive concept, a liquid sampling apparatus includes a frame configured to support a plurality of groundwater sampling bailers in circumferential spaced-apart relationship around a central axis of the frame, and a weight movably secured to the frame and configured to move between a retracted position and a downwardly extended position. Each bailer has an elongate tubular housing configured to collect and store a liquid sample from a body of liquid, such as water (e.g., a river, a lake, a pond, etc.). The bottom end of each bailer has an inlet nozzle through which a liquid sample is collected. When the liquid sampling apparatus is lowered onto the surface of a body of liquid, the weight is in the downwardly extended position and becomes submerged beneath the surface of the body of liquid. The submerged weight maintains the liquid sampling apparatus and the bailers in a generally vertical orientation during liquid sample collection. In addition, the weight serves as ballast to pull the frame into the body of the liquid sufficiently enough so that each bailer inlet nozzle is beneath the surface and can collect a sample. Once the bailers collect the samples, the liquid sampling apparatus is lifted from the liquid surface, for example, by hand, via a drone, etc.

In some embodiments, the frame includes a base having a plurality of holders, each holder configured to support a bottom end of a respective bailer, an upper portion configured to releasably secure the bailers to the frame, and at least one elongate member coupling the base and the upper portion in spaced-apart relation to each other. In some embodiments, each of the holders includes an opening through which the inlet nozzle of a respective bailer extends when supported in the holder.

In some embodiments, the upper portion of the frame is configured to slidably receive the bailers.

In some embodiments, the base includes a plurality of legs configured to support the liquid sampling apparatus on a solid surface. The weight is configured to move to the retracted position when the liquid sampling apparatus is supported on a solid surface. The weight is configured to move to the extended position when the liquid sampling apparatus is lifted from the solid surface. In some embodiments, the frame further comprises an elongate first member that extends between the base and the upper portion along an axial centerline of the frame, and the weight is supported by an elongate second member that is telescopically associated with the first member.

In some embodiments, the frame comprises a lifting handle that allows the apparatus to be manually lifted and/or lifted by a drone or other apparatus.

According to some embodiments of the inventive concept, a hands-free liquid sampling method includes lowering an apparatus into an open body of surface water, the apparatus supporting at least one groundwater sampling bailer, and collecting a sample of the water via the at least one groundwater sampling bailer while maintaining the apparatus and the at least one groundwater sampling bailer in a generally vertical orientation. The liquid sampling apparatus is then lifted from the liquid.

According to some embodiments of the present inventive concept, an aerial drone flies to a designated sample area and lowers a tethered liquid sampling apparatus into the water such that the bailers collect water samples. After sampling is completed, flight operations return the device and samples back to ground crews where they can be removed from the device. However, embodiments of the present inventive concept are not limited to the use of an aerial drone for deployment. Various other ways of deploying the liquid sampling apparatus of the present inventive concept may be utilized. For example, the liquid sampling apparatus can be deployed using a cable, a rope, a pole, or by hand, from a bridge, bank, other elevated surface, etc., without limitation.

Liquid sampling apparatus and methods, according to embodiments of the present inventive concept, are advantageous over conventional sampling apparatus and methods because they allow for sample collection in areas of restricted access and in dangerous areas that can present safety concerns for field personnel. As such, the need for wading or boat use in dangerous areas, such as a river, etc., can be eliminated. Moreover, the simultaneous use of a plurality of bailers allows the collection of sufficient sample volume in a single collection and with minimal preparation/setup.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item and is not intended to be limiting of such item. The common abbreviation "i.e.," which derives from the Latin phrase "id est," may be used to specify a particular item from a more general recitation.

It will be understood that although the terms first, second, third, etc., may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concept.

The terms "about" and "approximately", as used herein with respect to a value or number, means that the value or number can vary by +/−twenty percent (20%).

Embodiments of the present inventive concept can be utilized to collect samples from any body of surface water. Moreover, embodiments are not limited to just the sampling of water. As such, embodiments of the present inventive concept can be used in virtually any situation where a hands-free sampling of liquid is required from an open body of liquid and where it would be dangerous and/or difficult to use conventional sampling apparatus and methods.

Figure 1:
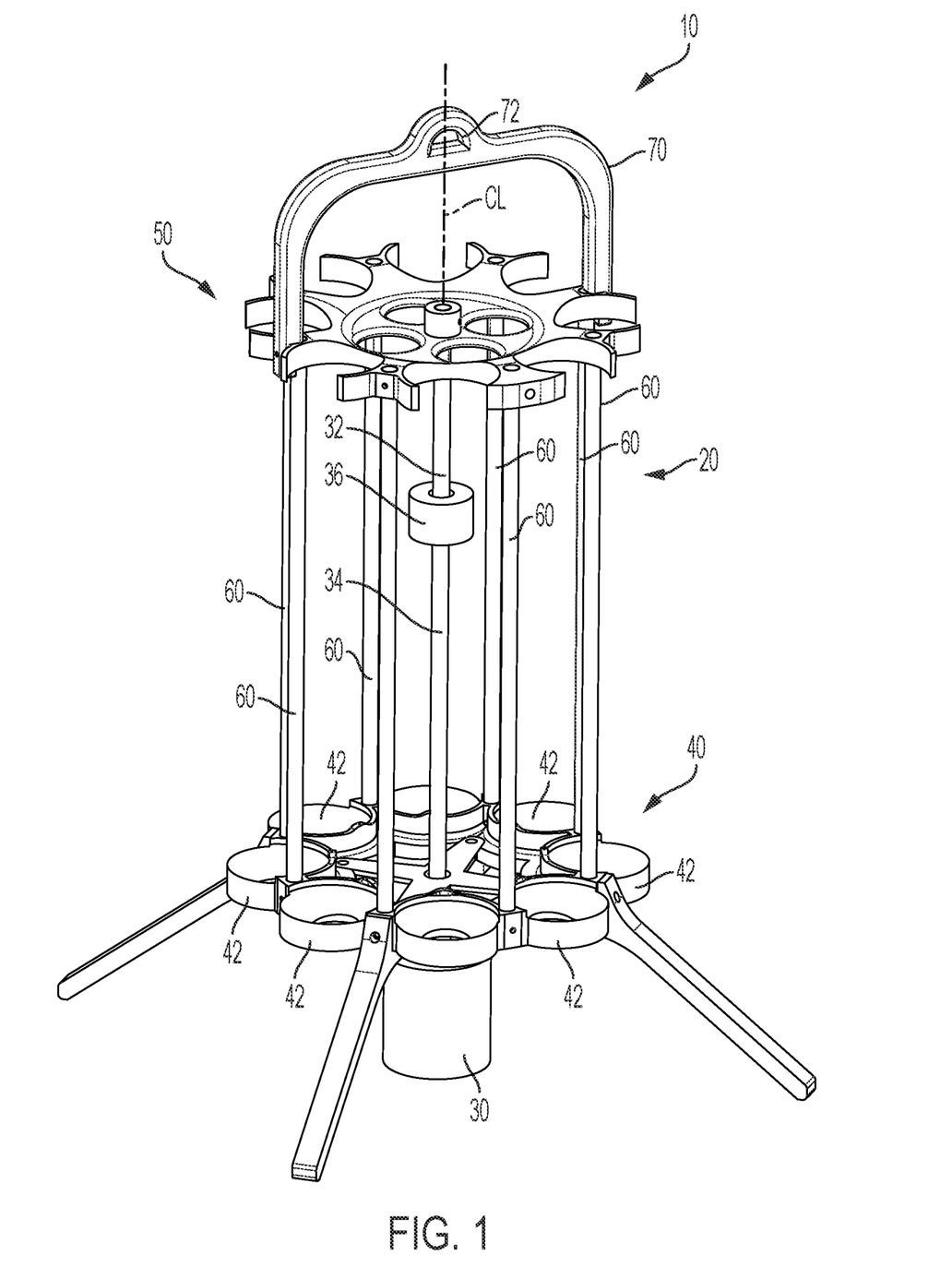
FIG. 1 is a top perspective view of a liquid sampling apparatus, according to some embodiments of the present inventive concept, and illustrating a weight in a retracted position.
Figure 2:
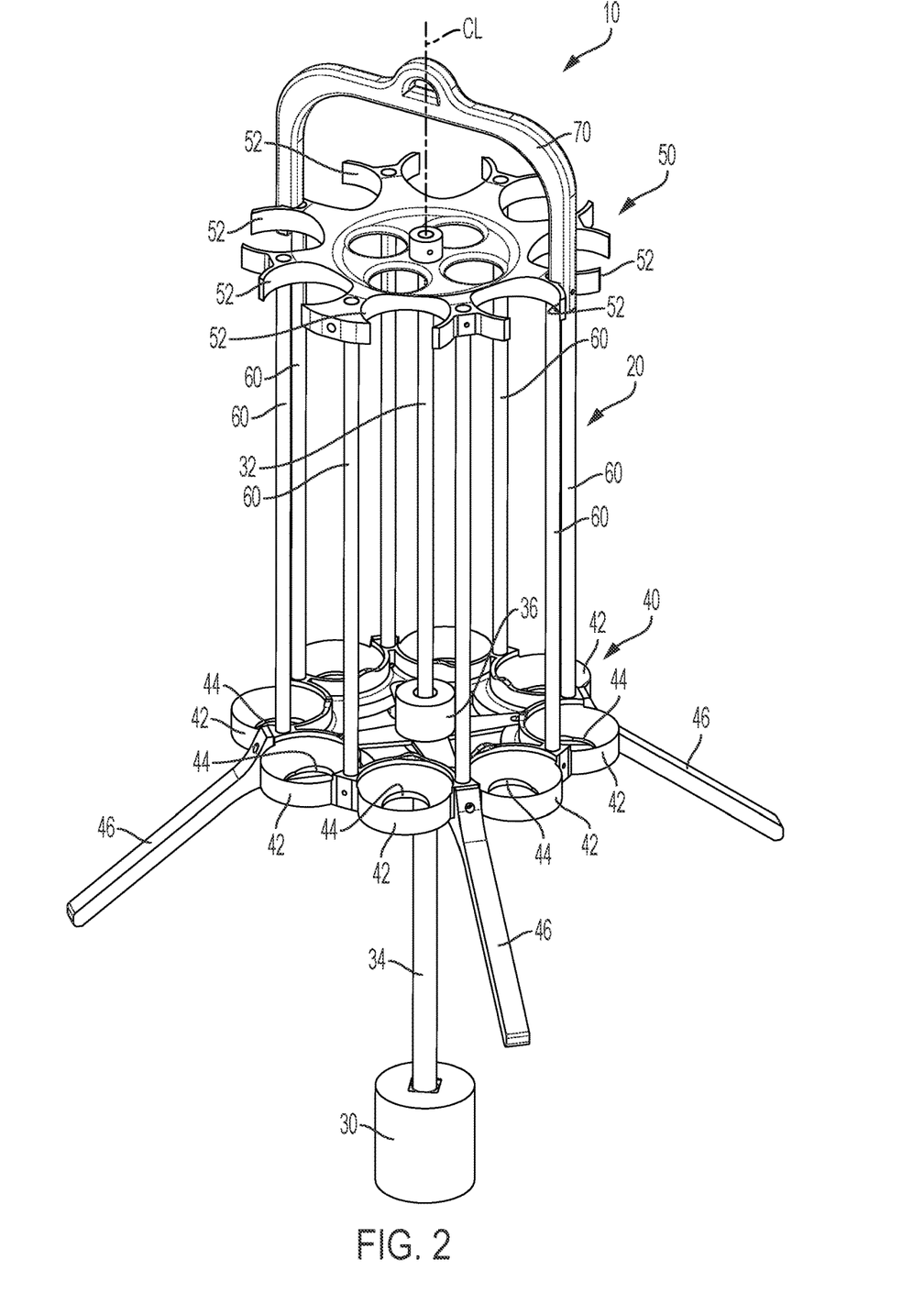
FIG. 2 illustrates the liquid sampling apparatus of FIG. 1 with the weight in a downwardly extended position.
Figure 3:
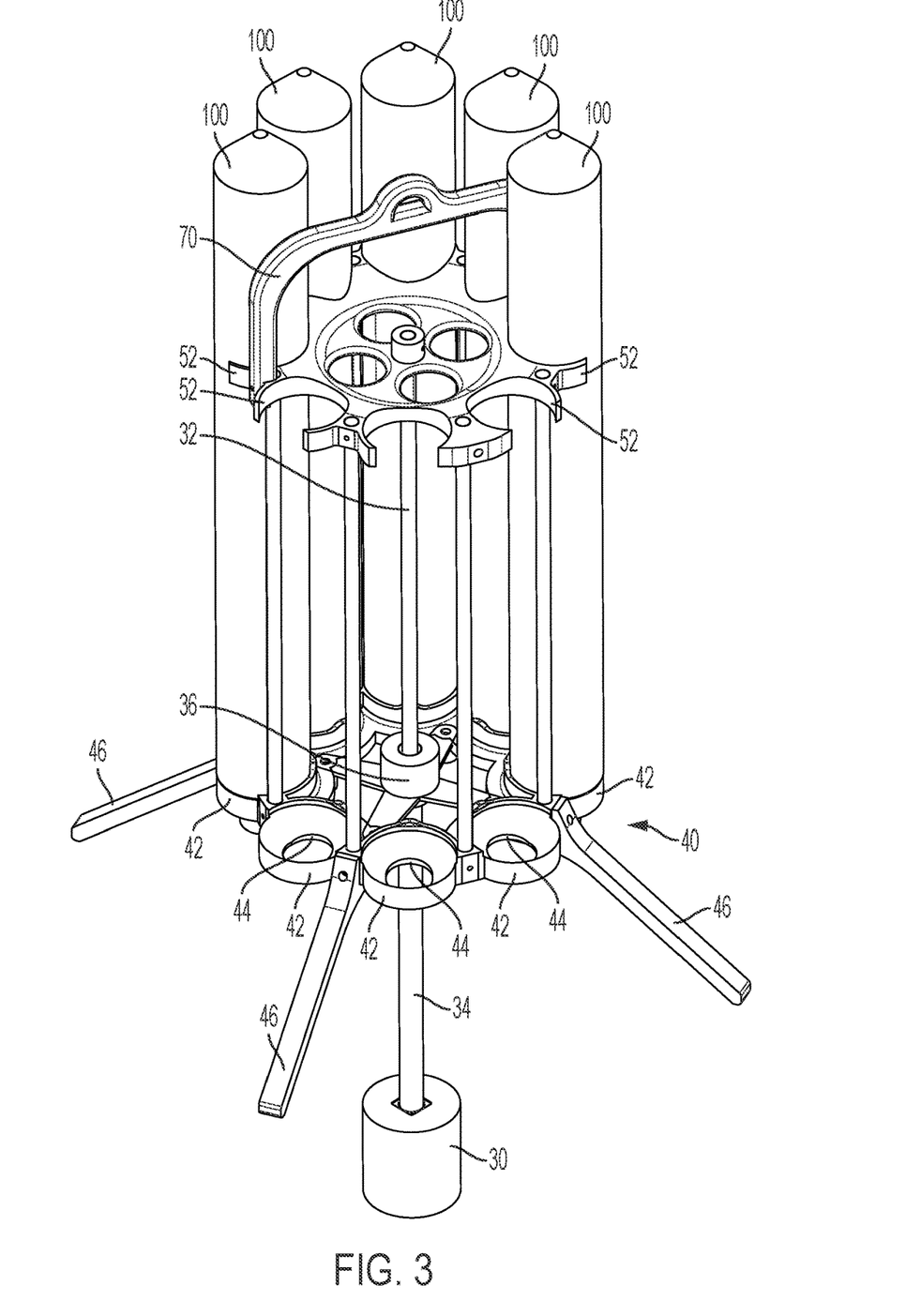
FIG. 3 illustrates the liquid sampling apparatus of FIG. 1 supporting a plurality of groundwater sampling bailers.
Figure 4:
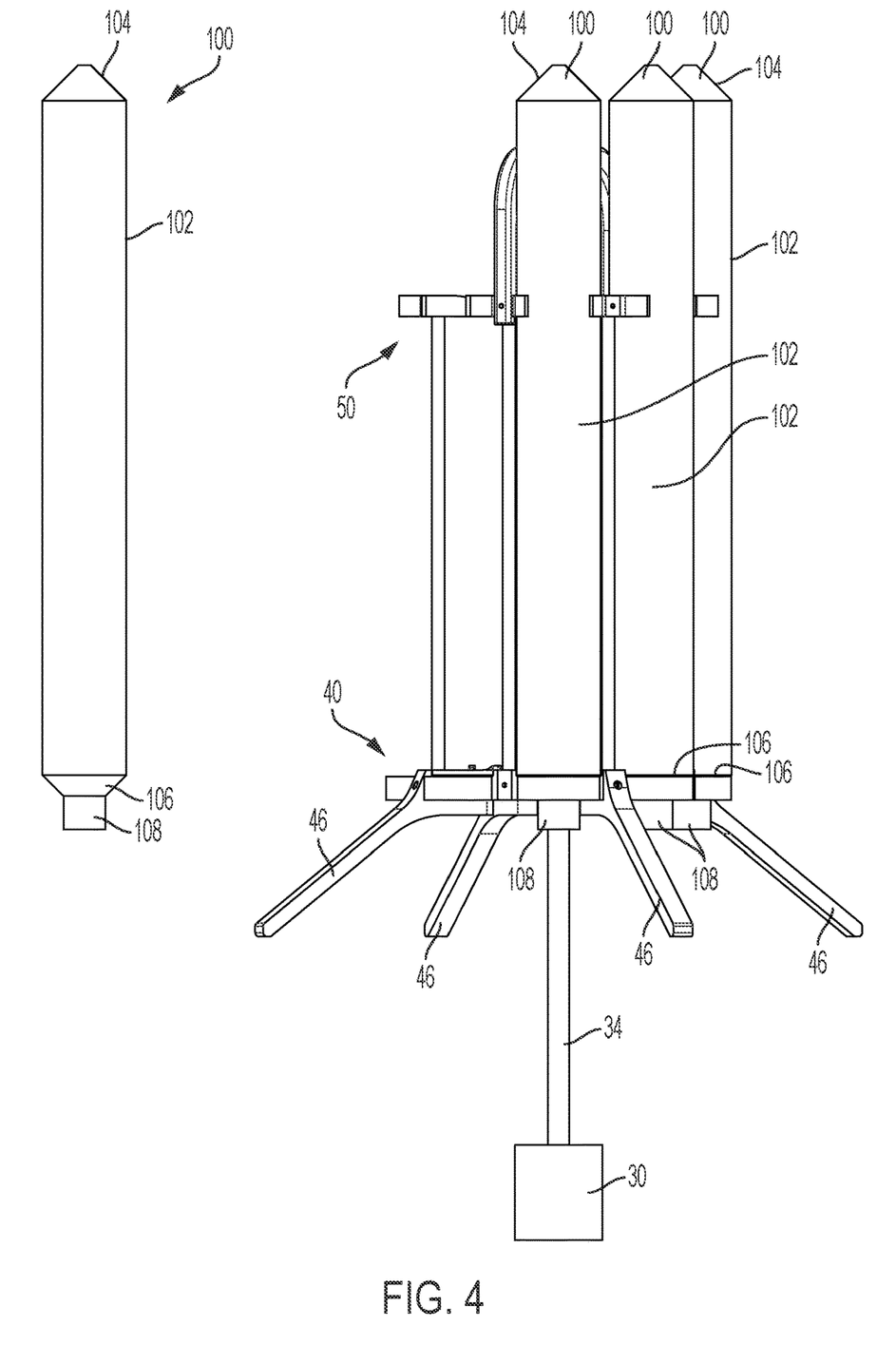
FIG. 4 is a side view of the liquid sampling apparatus of FIG. 3 with one of the bailers removed therefrom for clarity.

A liquid sampling apparatus and method will be described with reference to the figures. Referring to FIGS. 1-6, the illustrated liquid sampling apparatus 10 includes a frame 20 configured to support a plurality of groundwater sampling bailers 100 (FIGS. 3-6), and a weight 30 that is movably secured to the frame 20 and configured to move between a retracted position (FIG. 1) and a downwardly extended position (FIGS. 2-4). Each bailer 100 has an elongate tubular housing 102 configured to collect and store a liquid sample from a body of liquid, such as a river, a lake, a pond, etc., an upper end 104, and an opposite bottom end 106. As would be understood by one of skill in the art of the present inventive concept, the upper end 104 typically includes one or more perforations or vents and/or a check valve (not shown) and the bottom end 106 includes an inlet nozzle 108 and houses a check valve (not shown). In use, when the bailer 100 is lowered into a body of liquid, the check valve in the bottom end 106 is forced open by the liquid allowing the liquid being sampled to fill the bailer 100. Air within the housing 102 is forced out through the one or more perforations/vents and/or check valve in the upper end 104. As the filled bailer 100 is withdrawn, the check valve in the bottom end 106 closes, capturing the contents within the housing 102 of the bailer 100.

Various types of groundwater sampling bailers may be utilized with the liquid sampling apparatus 10, such as the Ecobailer disposable bailer, available from W. W. Grainger, Inc., Lake Forest, Ill. Bailers 100 that can be utilized with the liquid sampling apparatus 10 can have various configurations (i.e., construction materials, lengths, valves) based on sample method requirements, volume needs, and drone payload capacity if applicable.

In the illustrated embodiment, the frame 20 includes a base 40 having a plurality of holders 42 spaced apart around the centerline CL of the frame, as illustrated. Each holder 42 is configured to support a bottom end 106 of a respective bailer 100. The illustrated frame 20 also includes an upper portion 50 that is configured to releasably secure the bailers 100 to the frame 20. A plurality of elongate members or rods 60 couple the base 22 and the upper portion 30 in spaced-apart relation to each other, as illustrated. Each elongate rod 60 may be secured to the base 40 and upper portion 50 in various ways, without limitation. For example, in some embodiments, the ends of an elongate rod 60 may be threadingly engaged with one or both of the base 40 and upper portion 50, may be press or friction fit within one or both of the base 40 and upper portion 50, or may be welded to one or both of the base 40 and upper portion 50. Various other ways of securing the rods 60 to the base 40 and upper portion 50 may be utilized without limitation.

Although eight elongate rods 60 are illustrated, embodiments of the present inventive concept are not limited thereto. Various numbers of elongate rods 60, including a single elongate rod, may be utilized. Moreover, the elongate rods 60 may each have various cross-sectional configurations. Embodiments of the present inventive concept are not limited to the illustrated configuration and arrangement of the elongate rods 60.

Figure 5:
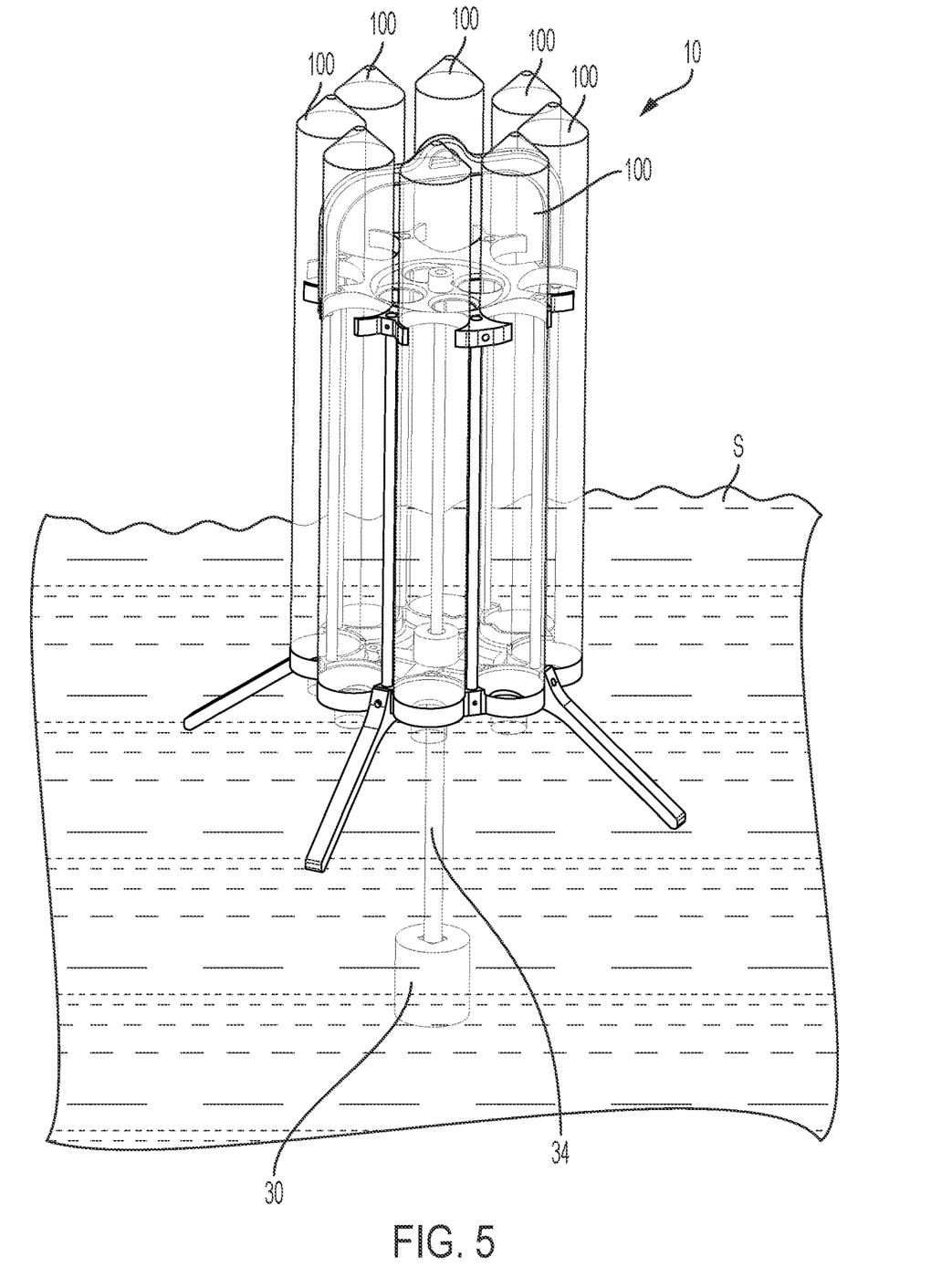
FIG. 5 illustrates the liquid sampling apparatus of FIG. 1 lowered onto the surface of an open body of liquid, such as a lake, a pond, a river, etc.
Figure 6:
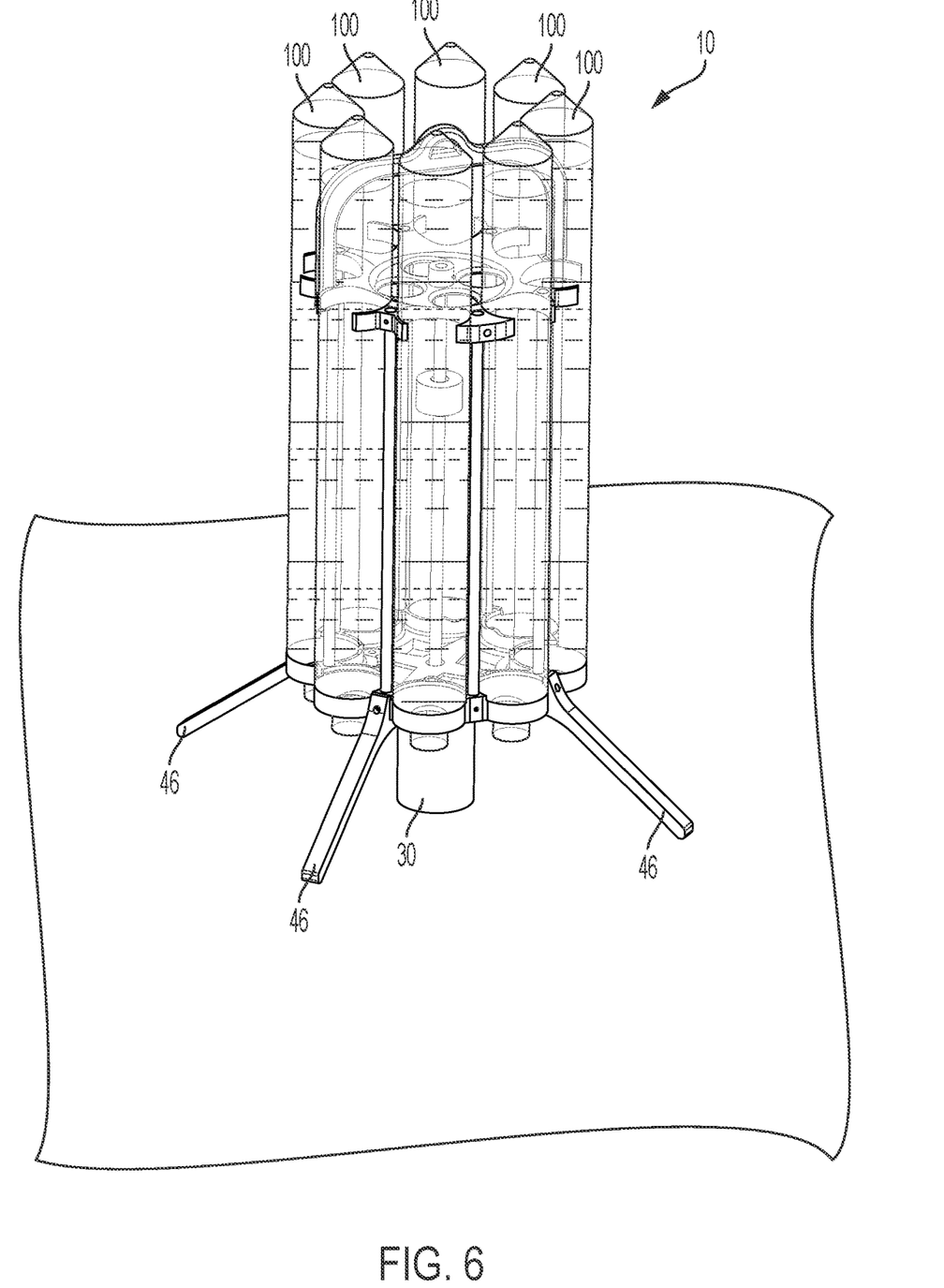
FIG. 6 illustrates the liquid sampling apparatus of FIG. 5 after samples have been collected in the bailers and with the sampling apparatus supported by the legs on a solid surface, such as the ground.

Each of the holders 42 has a configuration configured to receive the bottom end 106 of a bailer 100 therein. In the illustrated embodiment, each bailer 100 has a conical-shaped bottom end 106 and each holder 42 has a corresponding conical shape configured to receive a bailer bottom end 106 therein. In addition, each holder 42 includes an opening 44 through which the inlet nozzle 108 of a respective bailer 100 extends when supported in the holder 42, as illustrated in FIGS. 4-6. However, the holders 42 may have various configurations and shapes and need not conform exactly to the shape/configuration of a bailer bottom end.

Although eight holders 42 are illustrated, embodiments of the present inventive concept are not limited thereto. Various numbers of holders 42, including a single holder 42, may be utilized. Moreover, the holders 42 may all be configured to hold the same size bailer 100, or the holders 42 may be configured to hold bailers of different sizes. The liquid sampling apparatus 10 can be modified to accommodate varying bailer sizes and configurations.

The upper portion 50 of the frame 20 includes a respective plurality of openings 52 configured to slidably receive the bailers 100 therethrough, as illustrated. Each opening 52 has a diameter slightly larger than the diameter of a bailer 100 so that the bailer 100 is slidably received therein. To mount a bailer 100 to the frame, the bottom end 106 of a bailer 100 is inserted through an opening 52 and the bailer 100 is moved downwardly until the bottom end 106 is received in a respective holder 42. The openings 52 may have various configurations and embodiments of the present inventive concept are not limited to the illustrated configuration. Moreover, other ways of removably securing a bailer 100 to the frame 20 may be utilized. For example, a pair of flexible arms may be utilized to releasably secure a respective bailer 100 to the frame 20, etc.

The illustrated base 40 includes a plurality of legs 46 that are configured to support the liquid sampling apparatus 10 on a solid surface, such as the ground, a table, etc. Although four legs 46 are illustrated, embodiments of the present inventive concept are not limited thereto. For example, three legs may be utilized or more than four legs may be utilized. Moreover, legs having various shapes and configurations may be utilized. Embodiments of the present inventive concept are not limited to the illustrated shape and configuration of the legs 46.

When the liquid sampling apparatus 10 is lowered onto a solid surface, the solid surface contacts the weight 30 and moves the weight 30 to the retracted position. When the liquid sampling apparatus 10 is lifted from a solid surface, the weight 30 moves to the extended position under the force of gravity. In the illustrated embodiment, the frame 20 includes an elongate member 32 that extends between the base 40 and the upper portion 50 along the axial centerline CL of the frame 20. The weight 30 is supported by an elongate member 34 that is telescopically associated with elongate member 32 such that the weight 30 can move between retracted and extended positions. In the illustrated embodiment, elongate member 34 is a tube that receives elongate member 32 therein. However, in other embodiments, this telescopic relationship could be reversed with elongate member 32 being a tube that receives elongate member 34 therein. A stop 36 is secured to elongate member 34 and prevents the weight from extending beyond a predetermined length.

The frame 20 includes a lifting handle 70 that allows the apparatus to be manually lifted and/or lifted by a drone or other apparatus. The illustrated handle 70 includes a lifting eye configured to receive a lifting rope or cable, as would be understood by one of skill in the art.

Referring to FIG. 5, when the liquid sampling apparatus 10 is lowered onto the surface of an open body of liquid, the weight 30 is in the downwardly extended position and becomes submerged beneath the surface S of the body of liquid. The submerged weight 30 maintains the liquid sampling apparatus 10 and the bailers 100 in a generally vertical orientation during liquid sample collection. Without the frame 20 and extended weight 30, a groundwater sampling bailer placed onto an open body of liquid would not remain vertical for sampling. Instead, the bailer would fall on its side. Embodiments of the present inventive concept allow the use of groundwater sampling bailers for sampling open bodies of surface water, something that they are not designed for.

In addition, the weight 30 is sized so as to serve as ballast to pull the frame 20 into the open body of liquid sufficiently enough so that each bailer inlet nozzle is beneath the surface and can collect a sample. Once the bailers 100 collect the samples, the liquid sampling apparatus 10 is lifted from the liquid surface, for example, by hand, via a drone, etc. FIG. 6 illustrates the liquid sampling apparatus supported on a solid surface, such as the ground, and with the bailers 100 containing samples of a liquid.

Embodiments of the present inventive concept utilize bailers, traditionally used in groundwater sampling applications, to collect surface water. The multiple bailer configuration for the liquid sampling apparatus provides several advantages over existing sampling technology. One advantage is efficiency. The use of multiple bailers allows for method specific collection of various water chemistry parameters (samples) to be collected during one sample cast or flight, reducing time on-site. Moreover, because bailers are disposable, the need for cleaning between sample locations is eliminated. In addition, the use of multiple bailers may reduce the frequency or need for additional quality assurance samples (e.g., equipment blanks).

Another advantage is sample quality. One-time use bailers eliminates the potential for cross-contamination between sample locations. Most existing technologies use tubing and/or reusable bottleware. In addition, the potential for atmospheric contamination is limited because of the narrow nature of bailers and the availability of bailers with upper and lower ball valves.

Another advantage is the ability of the liquid sampling apparatus to deploy sampling containers to both lotic and lentic waterbodies while maintaining vertical orientation. Individual sample volumes can range from approximately 325 ml (12"×1.6" bailer) to 975 ml (36"×1.6" bailer size) per sample cast. Total volume of water collected during individual casts or flight ranges from approximately 650 ml (2-12" bailer config) to 7.8 L (8-36" bailers). This allows volume flexibility based on sample volume requirements and drone or other deployment device payload capacity. Bailers are also lightweight, resulting in less sampler weight and greater sample volume where payload may be a consideration.

Another advantage is personnel safety. The liquid sampling apparatus 10 according to the inventive concept allows for collection of bulk volume surface waters, eliminating the need for wading or boat use in dangerous river conditions (e.g., high flows, cold exposure).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A liquid sampling apparatus, comprising:
   a frame configured to support at least one bailer, the at least one bailer comprising an elongate tubular housing configured to collect and store a liquid sample from a body of liquid, the frame comprising:
   a base comprising at least one holder configured to support a bottom end of the at least one bailer;
   an upper portion configured to releasably secure the at least one bailer to the frame;
   at least one elongate member coupling the base and the upper portion in spaced-apart relation to each other; and
   an elongate first member that extends between the base and the upper portion along an axial centerline of the frame; and
   a weight movably secured to the frame, wherein the weight is configured to move between a retracted position and a downwardly extended position, wherein the weight in the downwardly extended position is configured to maintain the liquid sampling apparatus and the at least one bailer in a generally vertical orientation during liquid sample collection, wherein the weight is supported by an elongate second member that is telescopically associated with the first member.

2. The liquid sampling apparatus of claim 1, wherein the bottom end of the at least one bailer comprises an inlet nozzle, and wherein the at least one holder comprises an opening through which the inlet nozzle of the at least one bailer extends when supported in the at least one holder.

3. The liquid sampling apparatus of claim 1, wherein the upper portion of the frame is configured to slidably receive the at least one bailer.

4. The liquid sampling apparatus of claim 1, wherein the base comprises a plurality of legs configured to support the liquid sampling apparatus on a solid surface.

5. The liquid sampling apparatus of claim 4, wherein the weight is configured to move to the retracted position when the liquid sampling apparatus is supported on the solid surface by the legs, and wherein the weight is configured to move to the downwardly extended position when the liquid sampling apparatus is lifted from the solid surface.

6. The liquid sampling apparatus of claim 1, wherein the frame further comprises a lifting handle.

7. A liquid sampling apparatus, comprising:
   a frame configured to support a plurality of bailers in circumferential spaced apart relationship around a central axis of the frame, each bailer comprising an elongate tubular housing configured to collect and store a liquid sample from a body of liquid, the frame comprising:
- a base comprising a plurality of holders, each holder configured to support a bottom end of a respective one of the plurality of bailers;
- an upper portion configured to releasably secure the plurality of bailers to the frame; and
- at least one elongate member coupling the base and the upper portion in spaced-apart relation to each other; and
- an elongate first member that extends between the base and the upper portion along an axial centerline of the frame; and
- a weight movably secured to the frame, wherein the weight is configured to move between a retracted position and a downwardly extended position, wherein the weight in the downwardly extended position is configured to maintain the liquid sampling apparatus and the plurality of bailers in a generally vertical orientation during liquid sample collection, wherein the weight is supported by an elongate second member that is telescopically associated with the first member.

8. The liquid sampling apparatus of claim 7, wherein the bottom end of each bailer comprises an inlet nozzle, and wherein each holder comprises an opening through which the inlet nozzle of a respective bailer extends when supported in the holder.

9. The liquid sampling apparatus of claim 7, wherein the upper portion of the frame is configured to slidably receive the plurality of bailers.

10. The liquid sampling apparatus of claim 7, wherein the base comprises a plurality of legs configured to support the liquid sampling apparatus on a solid surface.

11. The liquid sampling apparatus of claim 10, wherein the weight is configured to move to the retracted position when the liquid sampling apparatus is supported on the solid surface by the legs, and wherein the weight is configured to move to the downwardly extended position when the liquid sampling apparatus is lifted from the solid surface.

12. The liquid sampling apparatus of claim 7, wherein the frame comprises a lifting handle.

13. A method of sampling surface water, the method, comprising:
- lowering an apparatus into an open body of surface water, the apparatus supporting at least one groundwater sampling bailer, wherein the apparatus comprises a frame that supports the at least one groundwater sampling bailer, and a weight movably secured to the frame between a retracted position and a downwardly extended position, the frame comprising:
  - a base with at least one holder supporting a bottom end of the at least one groundwater sampling bailer;
  - an upper portion that releasably secures the at least one groundwater sampling bailer to the apparatus; and
  - an elongate first member that extends between the base and the upper portion;
  - wherein the weight is supported by an elongate second member that is telescopically associated with the first member; and
- collecting a sample of the water via the at least one groundwater sampling bailer while maintaining the apparatus and the at least one groundwater sampling bailer in a generally vertical orientation.

14. The method of claim 13, wherein the weight is in the downwardly extended position during the collecting step.

15. The method of claim 13, wherein the at least one groundwater sampling bailer comprises a plurality of groundwater sampling bailers.

* * * * *